United States Patent
Harrison

(10) Patent No.: US 11,612,157 B2
(45) Date of Patent: Mar. 28, 2023

(54) FISH HOOK BARB DISABLER

(71) Applicant: Kenneth Harrison, Palm Beach Gardens, FL (US)

(72) Inventor: Kenneth Harrison, Palm Beach Gardens, FL (US)

(*) Notice: Subject to any disclaimer, the term of this patent is extended or adjusted under 35 U.S.C. 154(b) by 255 days.

(21) Appl. No.: 17/173,261

(22) Filed: Feb. 11, 2021

(65) Prior Publication Data

US 2022/0217960 A1 Jul. 14, 2022

Related U.S. Application Data

(60) Provisional application No. 63/135,359, filed on Jan. 8, 2021.

(51) Int. Cl.
*A01K 97/18* (2006.01)

(52) U.S. Cl.
CPC .................................. *A01K 97/18* (2013.01)

(58) Field of Classification Search
CPC ........ A01K 97/18; A01K 97/00; A01K 97/06; A01K 97/24; A01K 83/06; A01K 83/066; A01K 85/02; A01K 85/021; A01K 85/022
USPC ......... 43/43.2, 42.1, 42.4, 42.41, 53.5, 54.1, 43/57.1
See application file for complete search history.

(56) References Cited

U.S. PATENT DOCUMENTS

| | | | |
|---|---|---|---|
| 1,333,148 A | 3/1920 | Anderson | |
| 2,217,928 A | 10/1940 | Ward | |
| 2,861,383 A * | 11/1958 | Gray | A01K 97/18 43/53.5 |
| 2,990,641 A * | 7/1961 | Weidman | A01K 83/00 43/53.5 |
| 3,276,161 A | 10/1966 | Wagner | |
| 3,327,423 A * | 6/1967 | Kotis | A01K 83/06 43/44.2 |
| 3,624,690 A | 11/1971 | Ashley | |
| 3,670,448 A | 6/1972 | Wehmeyer | |
| 4,768,304 A * | 9/1988 | Preiser | A01K 83/00 43/43.16 |
| 4,987,695 A * | 1/1991 | Preiser | A01K 85/00 43/43.16 |
| 5,921,016 A | 7/1999 | Shelton | |
| 5,934,009 A | 8/1999 | Trahan | |
| 6,032,403 A | 3/2000 | Steck, III | |
| 6,138,401 A | 10/2000 | Duncan | |
| 6,688,034 B1 | 2/2004 | Mantel | |
| 6,705,042 B1 | 3/2004 | Harrison | |
| 8,201,358 B2 | 6/2012 | Dohi | |
| 9,737,060 B1 | 8/2017 | Racho | |
| 9,907,298 B2 | 3/2018 | White et al. | |

OTHER PUBLICATIONS

Martha Stewart, Lollipop Stand, https://www.marthastewart.com/7849736/lollipop-stand, published Aug. 5, 2020, accessed Dec. 15, 2022. (Year: 2020).*

* cited by examiner

*Primary Examiner* — Kathleen I Alker
(74) *Attorney, Agent, or Firm* — McHale & Slavin, P.A.

(57) ABSTRACT

A device for removing a barbed fish hook from the mouth of a fish. The device consists of a support base for holding snippets used to disable the effectiveness of a fish hook barb. When a fish hook barb is disable the fish hook may be readily removed from the fish without further harm to the fish. The device further employs an extension handle for snippet placement when a fish hook has been swallowed by a fish.

10 Claims, 2 Drawing Sheets

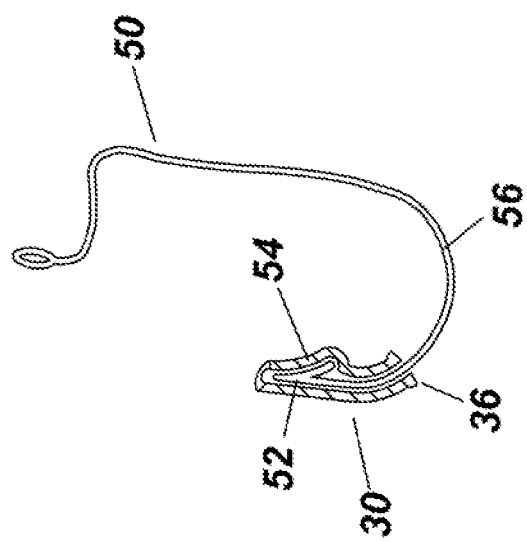
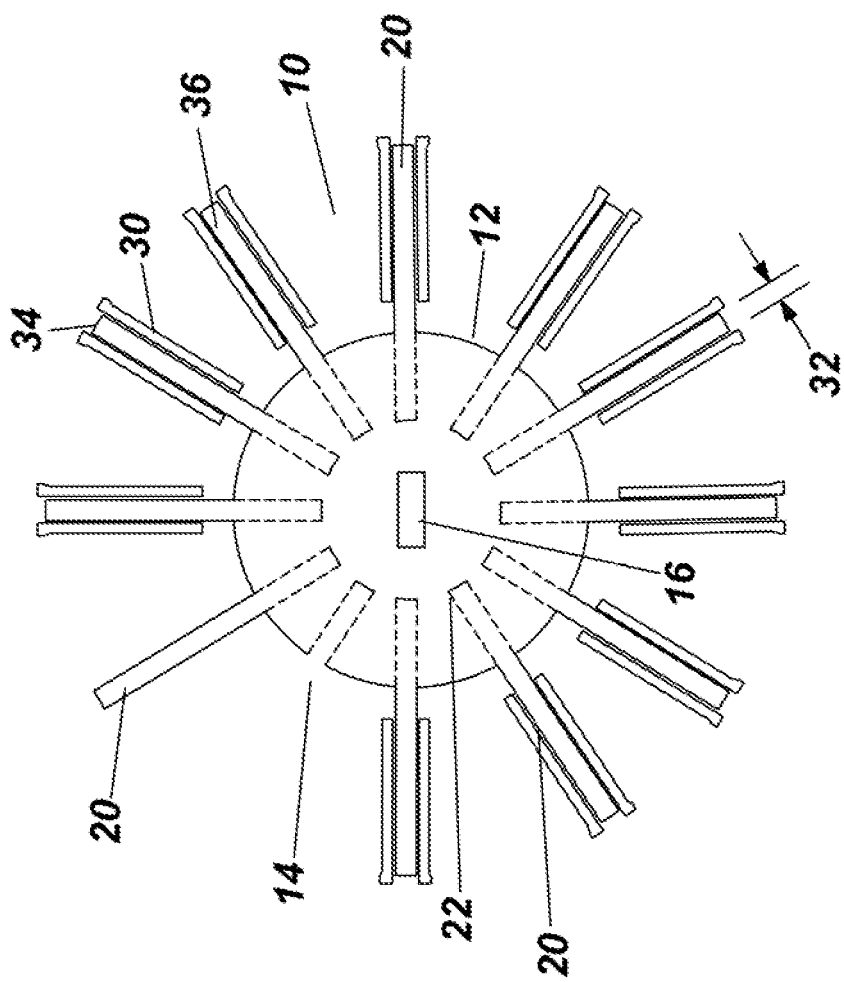
Fig. 2
Fig. 1

FISH HOOK BARB DISABLER

PRIORITY CLAIM

In accordance with 37 C.F.R. 1.76, a claim of priority is included in an Application Data Sheet filed concurrently herewith. Accordingly, the present invention claims priority to U.S. Provisional Patent Application No. 63/135,359, entitled "FISH HOOK BARB DISABLER", and filed Jan. 8, 2021; the contents of which are incorporated herein by reference.

FIELD OF THE INVENTION

The present invention relates generally to the field of fishing and, more particularly, to a device for removing a barbed hook from the mouth of a fish.

BACKGROUND OF THE INVENTION

Sport and recreational fishing endeavors to catch and release fish with minimal harm to the fish. Numerous devices for catching fish have been introduced over the years, with the conventional barbed fish hook being the most prolific style of fishing tackle. The conventional hook consists of a pointed tip with a barb on one end before curving through a shank having an eye formed along a second for use in securing the hook to a fishing line. When a fish is hooked, the fish hook preferably catches the mouth of the fish with the shank on the inside of the mouth and the point/barb on the outside of the fish mouth. If the fish hook enters upside down it will protrude through the top of the fish head or often through the eye channel making removal of the fish hook difficult and hazardous, if not fatal to the fish. If the fish is to be released from the fish hook, the barb of the fish hook must be withdrawn without causing irreparable damage to the fish. While the barb of the fishing hook easily passes through soft tissue, the shape of the barb is designed to prevent removal. The barb shape allows for unidirectional passage of the barb, making a reverse direction difficult without harming the fish.

In addition, the surface of a fish does not allow the fisherman to leverage the hook from the mouth of the fish by fingers alone. Typically, a fisherman will remove a fish hook from the mouth of a fish using a pliers or the like tool. However, while the pliers facilitates removal in some instances, a fisherman will often yank the fish hook out of the fish's mouth which dislodges the fish hook but will damage the fish. In many instances the use of a pliers is cumbersome and ill-suited to the fish hook removal process. Besides damaging the fish, the pliers can damage the fish hook, causing the fisherman to secure a replacement fish hook including time spent on retying the fishing line.

Numerous disclosures address the problem presented by the conventional barb and provide various solutions. For instance, U.S. Pat. No. 1,333,148 discloses a wire that is placed over the fish hook barb to mask the point of the barb. U.S. Pat. No. 3,276,161 discloses a fish hook extractor that is slid over the shank of the fish hook. U.S. Pat. Nos. 2,217,928; 3,624,690; and 9,907,298 disclose retractable barbs. U.S. Pat. No. 8,201,358 discloses the use of a hook with grooves instead of barbs.

U.S. Pat. No. 6,032,403 discloses a hand held device for disengaging a fish hook from a fish's mouth using a through bored tubular body having a proximal end sized for manual gripping and a slot extending the length of the tubular body for aligning the slot with a fishing line.

U.S. Pat. No. 9,737,060 discloses a fish hook with at least one barb fixed to the fish hook with an epoxy that debonds upon the application of an electric current.

U.S. Pat. No. 6,138,401 discloses a fish hook remover having a spiral hook engaging flight. The spiral hook engaging flight is generated about an axis with a central hook shank receiving opening. A spiral line guide opening is defined by the flight that spirals into the central hook shank receiving opening such that a fish line engaged laterally by the flight will be guided into the central hook shank receiving opening.

U.S. Pat. No. 5,921,016 discloses a fish hook remover having a handle for a user to manipulate, a hook engagement member, and two rods which connect the handle and the hook engagement member.

U.S. Pat. No. 6,688,034 discloses a fish hook remover having a lengthwise base member, a combination handle, an actuation rod, and a rotary arm. The combination handle is attached to one end of the lengthwise base member and a yoke is formed on the other end of the lengthwise base member. A knob is attached to one end of the actuation rod and a rack is formed on the other end of the actuation rod.

U.S. Pat. No. 6,705,042 discloses an apparatus for extracting a fish hook from a fish having a support apparatus for placing over a fish hook embedded in a fish, an operative release member reciprocally removable relative to the position of the fish hook.

U.S. Pat. No. 3,670,448 discloses a fish hook locator-extractor for locating and extracting a fish hook using an elongated shank having a rounded pear-shaped handle at one end. The opposite end portion of the shank is hollow and terminates in a plurality of longitudinally extending, circumferentially spaced rounded projections separated by sharp V-shaped recesses.

U.S. Pat. No. 5,934,009 discloses a fish hook remover comprising a handle with an elongated hook removing member attached to the handle, wherein the hook removing member includes a V-shaped tip adapted to engage a hook; a hand guard attached to the handle, wherein the hand guard includes an outer periphery that is larger than the cross-sectional area of the handle; and a line looping member formed on the hand guard.

The above cited references all recognize the damage a barb will cause a fish using various fishing hooks. However, a conventional fish hook remains the most effective and least expensive alternative so it remains the most commonly used. What is needed in the field is a device capable of disabling the barb on a conventional fish hook, allowing ease of fish hook removal without damaging the fish or the fish hook.

SUMMARY OF THE INVENTION

A barbed fish hook removing device consisting of a tubular shaped flexible plastic or rubber snippet that is slid over a fishing hook tip and barb, wherein the snippet disables the effectiveness of the barb. When the snippet is in position, the fish hook can be readily removed from the mouth of the fish without further harm to the fish. The snippet is constructed of a flexible plastic or rubber tubing that conforms to the shape of the barb. In a preferred embodiment, the snippet is held by a circular shaped support base having a receptacle for receipt of discarded snippets. The perimeter of the support base employs a plurality of channels for receipt of stems, each stem having a proximal end and a distal end. The proximal end of each stem is releasably attached to the channel and the distal end extends outwardly therefrom for holding of a snippet. A snippet is slidably attached to each stem having an inner diameter sized to frictionally engage the distal end of the stem. The snippet is slid off the stem and onto the tip and barb of the fish hook tip, wherein the barb is disabled from its primary function. With the barb disabled, a fish hook can be readily backed out of the skin of a fish without further harm to the fish.

The device further includes an extension handle used in conjunction with the support base. The extension handle receives a stem and snippet for use in instances where the fish has swallowed the fish hook. The handle is at least 8 inches long, and has a hand grip positioned on one end and a channel formed along an opposite end. The channel is for receipt of the distal end of a stem, wherein the stem holds the snippet for placement over the tip of the fish hook. A catch on the side of the handle allows the fish hook to be dislodged once the snippet has disabled the barb.

It is therefore an objective of this invention to provide a fish hook removing device that can remove a fish hook from the mouth of a fish with little or no damage to the fish.

Another objective of the invention is to teach the use of a barbed fish hook removing device that consists of a tubular shaped flexible plastic or rubber snippet that is slid over a fishing hook tip and barb wherein the snippet disables the effectiveness of the barb.

Another objective of the invention is to teach the use of a support base having a plurality of channels formed along a perimeter thereof for receipt of stems, each stem having a proximal end releasably attached to the channel and the distal end that extends outwardly for holding of a snippet. The snippet is slidably attached to the distal end of each stem, each snippet having an inner diameter sized to frictionally engage a fishing hook barb.

Yet still another objective of the invention is to provide a support base receptacle allowing for the one-way insertion of spent snippets for later disposal.

Still another objective of the invention is to teach the use of a snippet on an extension handle to readily remove a fish hook from a fish that has swallowed the fish hook.

Another objective of the invention is to provide a support base and extension handle constructed of a buoyant material having a specific gravity sufficient to float.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

BRIEF DESCRIPTION OF THE FIGURES

FIG. 1 is a top view of a support base of the instant invention;

FIG. 2 is a pictorial view of a fish hook with a snippet covering the tip and barb;

DETAILED DESCRIPTION OF THE INVENTION

Figure 4:
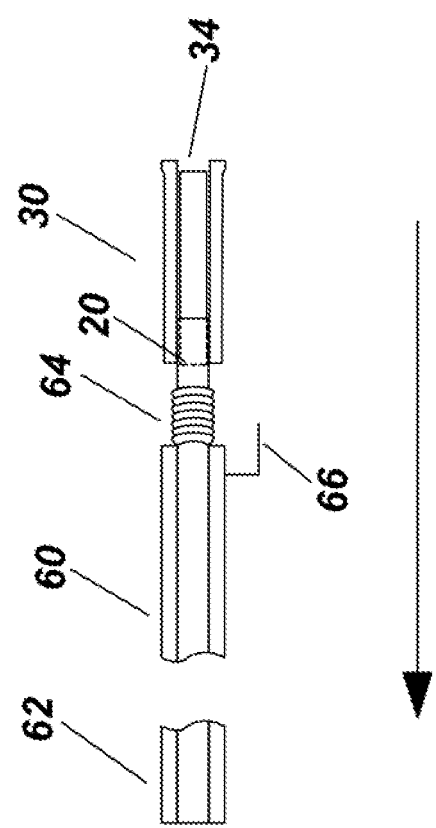
FIG. 4 is a side view of a handle for dispensing a snippet from a distance.
Figure 3:
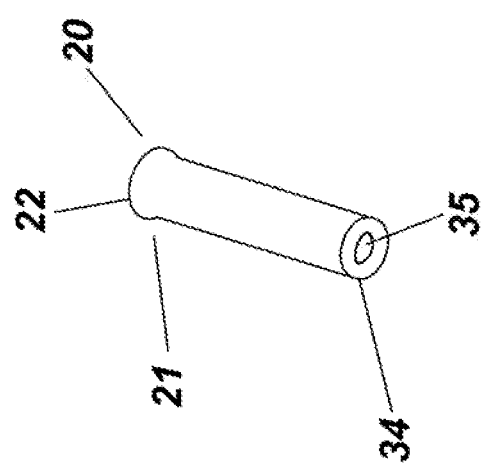
FIG. 3 is a perspective view of a stem.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

Now referring to the Figures, illustrated is a device to disable a fish hook barb. The device includes a support base 10 having a circular shaped perimeter 12 with a plurality of channels 14 formed therein. Each channel 14 receives a stem 20 having a proximal end 22 and a distal end 34. The proximal end 22 of each stem 20 is releasably attached to the channel 14 and the distal end 34 extends outwardly from the perimeter 12. In a preferred embodiment, the proximal end 22 includes a tab 21 providing a tactile feel for insertion and removal. The distal end 34 of the stem 20 includes an indent 35 sized to accept no more than one half of a fish hook barb wherein a snippet will engage a reverse point on the fish hook barb before pulling away from the stem.

A snippet 30 formed from a flexible plastic or rubber tube is slidably attached to the distal end 34 of each stem 20; the snippet 30 having an inner diameter 32 sized to frictionally engage a conventional fishing hook 50 comprising a tip 52 and barb 54. The snippet 30 is a soft flexible material that will easily stretch allowing it to side over the tip 52 of the fish hook 50 and immediately conform to diameter of the fish hook 50. The support base 10 is constructed of a buoyant material having a specific gravity sufficient to allow the support base to float in fresh or salt water. The snippets 30 are transparent and flexible that allows the slidable placement of the snippet 30 over the barb 54 and visual confirmation that the barb is covered. The snippet 30 cannot be pulled off the barb, however, the snippet 30 can rotated to allow unscrewing of the snippet. The support base 10 is hollow, forming a receptacle 16 for receipt of spent snippets to be discarded. It should also be noted that the snippet can remain on the fish hook when the fishing gear is in storage. The snippet 30 protects the fish hook 50 from causing injury to an individual, and allows safe storage without fear of an individual being snagged by a fish hook.

If a fish hook 50 engages a fish, the tip 52 and barb 54 of the fish hook would extend through the thin membrane in the side or bottom of the mouth which is easily removed. However, if the fish hook enters upside down it will protrude through the top of the head or often through the eye socket making removal difficult and hazardous, if not fatal to the fish. In some fish hooking the bottom of the mouth is also difficult to remove. The instant device will assist in a safer removal of the hook to minimize further damage to the fish by facilitating a quick and effortless release. For example, a fisherman looking to release a fish would grasp the support base 10 and align a snippet 30 to the tip 52 of the fish hook 50. The end 34 of the stem 20 is indented 35 and allows ease of aligning the opening 36 of the snippet 30 with the tip 52 of the fish hook 50. The indent is sized to accept no more one half of a fish hook barb wherein said snippet will engage a reverse point on the fish hook barb before pulling away from the stem 20. The individual would then grasp the snippet 30, sliding it off the stem 20 and onto the tip 52 and barb 54 of the fish hook 50. The snippet conforming to shape of the fish hook. The barb 54 causes a unidirectional placement of the snippet 30 for the same reason the barb will not readily reverse direction when hooked on a fish. Once the snippet 20 is placed over the tip 52 and barb 54, the barb is disabled and the fish hook 50 can be readily removed from the fish. Once the fish hook 50 has been removed from the fish, the snippet 30 can remain on the hook for protection during storage, or be removed from the fish hook 50 by rotating the snippet 30 at the same time the snippet 30 is pulled which creates a rotational unscrewing effect. If a snippet 30 is spent, the snippet 30 can be placed into the receptacle 16 in the support base 10 for subsequent disposal.

In the preferred embodiment, the stems 20 are constructed and arranged to engage the channels 14, allowing the stems 20 to be removed by grasping the distal end 34 of the stem 20. Alternatives to frictional engagement would be the use of a tab, not shown, formed in the stem channel to allow the stem to snap in and out.

Referring to FIG. 4, a stem 20 having a snippet 30 may be attached to an extension handle 60 that is about 10" long. The extension handle 60 provides an extension to the support base 10 for fish hooks 50 that have been swallowed by the fish. For instance, a fisherman grasps the end 62 of the extension handle 60 and aligns it with the opening 36 of the snippet 30 with the tip 52 of a fish hook 50. Once aligned, the handle 60 is pushed toward the tip 52, wherein a spring 64 assists in pushing the snippet 30 over the fish hook barb 54. The handle 60 operates as an extension to the support base 10 for those harder to reach fish hooks. Once the snippet 30 is attached to the fish hook 50, a catch 66 formed in the side of the handle 60 is used to engage the shank 56 of the fish hook 50 to dislodge the fish hook 50 from the fish. It is noted that the length of the handle 60 allows for a deep insertion into a fish with the catch 66 available to dislodge the fish hook 50 once the barb 54 has been disabled. The handle 60 is constructed of a buoyant material having a specific gravity sufficient to allow the handle 60 to float.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A device to disable a fish hook barb comprising:
   a support base having a circular shaped perimeter with a plurality of channels formed in said perimeter;
   a plurality of stems, each stem having a proximal end and a distal end, each said proximal end of each said stem releasably securable to one of said channels with said distal end of each said stem extending outwardly from said support base perimeter, said distal end including an indent sized to accept no more than one half of the fish hook barb therefrom;
   a snippet slidably attached to said distal end of each said stem, said snippet having an inner diameter sized to frictionally engage a fishing hook tip and barb;
   wherein said snippet is removed from said stem and positioned over the tip and barb of a fish hook so as to engage a reverse point on the fish hook barb before pulling away from said stem whereby the tip and barb of the fish hook are covered with the snippet allowing ease of fish hook removal from the mouth of a fish.

2. The device to disable a fish hook barb according to claim 1 wherein said proximal end of said stem includes a tab for frictional engagement of said stem to said channel.

3. The device to disable a fish hook barb according to claim 1 including an extension handle having a hand grip positioned on one end and a channel formed along an opposite end, said channel for receipt of said distal end of a stem, said stem holding at least one snippet wherein said extension handle permits placement of said snippet to be removed from said stem and positioned over the tip and barb of the fish hook.

4. The device to disable a fish hook barb according to claim 1 wherein said snippet is a flexible plastic or rubber tube sized to slide over a barb, wherein said barb allows removal of said snippet only by rotational unthreading.

5. The device to disable a fish hook barb according to claim 1 wherein said support base includes a receptacle for receipt of spent snippets.

6. The device to disable a fish hook barb according to claim 1 wherein said support base is constructed of a buoyant material having a specific gravity sufficient to allow said support base to float.

7. A device to disable a fish hook barb comprising:
   a support base having a circular shaped perimeter with a plurality of channels formed along said perimeter, said support base including a receptacle;
   a plurality of stems, each said stem having a proximal end and a distal end, said proximal end of each said stem releasably attached to one of said channels and said distal end of each said stem extending outwardly from said support base perimeter, said distal end including an indent sized to accept no more than one half of the fish hook barb therefrom;
   a snippet formed from a flexible plastic or rubber tube slidably attached to said distal end of each said stem, said snippet having an inner diameter with an opening sized to frictionally engage a fishing hook tip and barb;
   wherein said snippet is removed from each said stem and positioned over the tip and barb of a fish hook so as to engage a reverse point on the fish hook barb before pulling away from said stem whereby the tip and barb of the fish hook are covered with the snippet allowing ease of fish hook removal from the mouth of a fish.

8. The device to disable a fish hook barb according to claim 7 wherein said support base is constructed of a buoyant material having a specific gravity sufficient to allow said support base to float.

9. The device to disable a fish hook barb according to claim 7 including an extension handle having a hand grip positioned on one end and a channel formed along an opposite end, said channel for receipt of said distal end of said stem, said stem holding at least one snippet wherein said extension handle permits placement of said snippet on a fish hook swallowed by a fish.

10. The device to disable a fish hook barb according to claim 9 wherein said extension handle is constructed of a buoyant material having a specific gravity sufficient to allow said handle to float.

* * * * *